United States Patent [19]

Bruederle

[11] Patent Number: 4,858,858

[45] Date of Patent: Aug. 22, 1989

[54] PROCESSS FOR THE REACQUISITION OF THE PITCH ATTITUDE OF AN EARTH SATELLITE

[75] Inventor: Ernst Bruederle, Ottobrunn, Fed. Rep. of Germany

[73] Assignee: Messerschmitt-Bolkow-Blohm GmbH, Ottobrunn bei Muenchen, Fed. Rep. of Germany

[21] Appl. No.: 240,921

[22] Filed: Sep. 6, 1988

[30] Foreign Application Priority Data

Sep. 3, 1987 [DE] Fed. Rep. of Germany ....... 3729389

[51] Int. Cl.$^4$ .............................................. B64G 1/28
[52] U.S. Cl. .................................................. 244/165
[58] Field of Search ....................... 244/164, 165, 170; 364/432, 434, 453, 459; 318/648, 584, 585

[56] References Cited

U.S. PATENT DOCUMENTS

| | | | |
|---|---|---|---|
| 3,591,108 | 7/1971 | Perkel | 244/165 |
| 3,695,554 | 10/1972 | Phillips | 244/170 |
| 4,084,772 | 4/1978 | Muhlfelder | 244/165 |
| 4,193,570 | 3/1980 | Hoffman et al. | 244/165 |
| 4,275,861 | 6/1981 | Hubert | 244/165 |
| 4,424,948 | 1/1984 | Muhlfelder et al. | 244/170 |
| 4,504,032 | 3/1985 | Phillips et al. | 244/170 |

*Primary Examiner*—Galen L. Barefoot
*Attorney, Agent, or Firm*—Toren, McGeady & Associates

[57] ABSTRACT

A reacquisition process is used in the event that an earth orientation of the yaw axis Z of an earth satellite is lost, in that the angular velocity $\omega$ of a flywheel, the rotational axis of which is oriented in the direction of a pitch axis Y, falls below a predetermined value as a result of an insufficient energy supply. After restoration of the energy supply, the pitch attitude of the earth satellite and, accordingly, the earth orientation of the yaw axis Z, are to be restored. For this purpose, constantly alternating increases and decreases in speed are commanded for the flywheel in a determined manner in correlation with the zero passages of the pitch deviation, whereby the satellite is subjected to a constant reversal of its direction of rotation. This occurs until the angular momentum of the satellite falls below a predetermined value during a zero passage of the pitch deviation.

6 Claims, 2 Drawing Sheets

PROCESSS FOR THE REACQUISITION OF THE PITCH ATTITUDE OF AN EARTH SATELLITE

FIELD AND BACKGROUND OF THE INVENTION

The invention is directed to a process for the reacquisition of the pitch attitude of an earth satellite which is equipped with an earth sensor and a flywheel that is oriented with its axis of rotation in the direction of the pitch axis (Y axis) of a coordinate system (X, Y, Z) which is fixed with respect to the satellite. The satellite is to be oriented in orbit, with its yaw axis (Z axis) pointed toward the earth'S center and with its roll axis (X axis) pointing in the orbiting direction. The inventive reacquisition process is to be applied in the event that the angular velocity $\omega$ of the flywheel which is kept between a lower value $\omega_L$ and an upper value $\omega_U$ in normal operation, drops below the lower value $\omega_L$ due to an insufficient energy supply, and earth orientation of the yaw axis is consequently lost.

Geosynchronous earth satellites which are three axis stabilized are frequently equipped with a flywheel and with an earth sensor for the purpose of attitude control. The object of the attitude control is to keep the satellite oriented with the X axis (roll axis) of its coordinate system (X, Y, Z), which is fixed with respect to the satellite, constantly pointing toward the orbiting direction, with its Z axis (yaw axis) constantly pointing toward the earth'S center, and with its Y axis (pitch axis) held perpendicular to the two other axes and relative to the orbital plane. The flywheel is directed with its axis of rotation parallel to the pitch axis, and its angular velocity $\omega$ in normal operation is kept within a preselectable speed range, defined by means of the lower value $\omega_L$ and the upper value $\omega_U$. The attitude control around the pitch axis, i.e., the orientation of the yaw axis with respect to the earth, is effected by means of corresponding angular velocity changes of the flywheel as soon as the earth sensor, whose visual field is directed to the earth or the earth horizons, determines a deviation of the yaw axis from the desired orientation to the earth'S center. Accordingly, during one orbital revolution, the satellite rotates approximately once around its pitch axis. Normally, thus, it must constantly have an angular momentum around this axis although this may be relatively small. This angular momentum of the satellite is very small in normal operation in comparison with the angular momentum of the flywheel.

In order to effect corresponding changes in speed of the flywheel during attitude disturbances caused by external influences which are not easily foreseeable, the energy supply of the satellite must be intact. This is usually ensured by means of solar cells and/or batteries. If the energy supply for the engine or motor for changing the speed of the flywheel fails, readjustments during incipient attitude disturbances are no longer possible and the flywheel, also steadily loses rotational energy because of the occurring friction, i.e., its speed soon decreases below the allowable lower value $\omega_L$. Because of the angular momentum conservation theorem, a corresponding increase in the angular momentum of the satellite occurs, i.e., the latter begins to rotate more than is desired. Therefore, the yaw axis will soon migrate out of the zero or neutral attitude determined by the orientation to the earth'S center, and the earth will disappear from the visual field of the earth sensor. As the speed of the flywheel continues to decrease, the satellite rotates continuously faster. This event can occur particularly when the solar cells are unable to supply energy in the shadow of the earth and the battery fails. When the energy supply is restored, the satellite should be returned as quickly as possible to the desired attitude, i.e., a reacquisition process for the pitch attitude of the satellite must be activated. This process can be introduced, for example, as soon as the direction of solar radiation deviates by not more than 45°, for example, from that of the normal line of the solar generator after emerging from the earth'S shadow. This usually happens as soon as the satellite emerges from the earth'S shadow because of its rotation.

SUMMARY OF THE INVENTION

The present invention has the object of providing a process for the reacquisition of the pitch attitude of an earth satellite, whereby the satellite resumes its correct pitch attitude (pitch deviation $\theta=0$) with the lowest possible expenditure with respect to instrumentation and process technology, in a manner which is as rapid as possible and can be carried out automatically. Accordingly, the present invention provides a process for the reacquisition of the pitch attitude of an earth satellite which is equipped with an earth sensor for sensing any deviation of the pitch angle $\theta$ from zero which corresponds to the correct yaw axis orientation, a flywheel having a rotational axis oriented in the direction of the correct pitch axis, the pitch axis being in a coordinate system which is fixed with respect to the satellite and the satellite being normally oriented in orbit with the yaw axis pointing toward the earth'S center and with the roll axis pointing in the orbital direction. With full power in the satellite, the flywheel normally rotates at an angular velocity which is maintained between a selected lower value and a selected upper value. The process of the present invention is utilized only after the angular velocity has fallen below the lower value by more than a preselected amount and, further, after the energy supply has been restored while the earth sensor no longer has the earth in its visual field. At this point, the process for reacquisition of the pitch attitude of the earth satellite operates to increase the angular velocity of the flywheel to a new value which equals the lower selected value minus the predetermined amount of deviation from the lower selected value. This increase is maintained until the earth sensor determines a zero passage for the pitch angle ($\theta=0$). After this zero passage, the angular velocity of the flywheel is further increased up to the upper value which guarantees a reversal of the rotational direction of the satellite as a whole. Then, during every additional zero passage of the pitch angle, as determined by the earth sensor, a new angular velocity is applied to the flywheel which alternately decreases and increases as compared with a respective preceding angular velocity by the amount $qH_s/I_w$, where $H_s$ is the actual or estimated angular momentum of the satellite during the zero passage, $I_w$ is the moment of inertia of the flywheel, and q is greater than 1 but less than 2. Finally, the step of alternately increasing and decreasing the angular velocity is repeated until the angular momentum of the satellite, during the zero passage, has fallen below a preselected desired value $H_{so}$ for the angular momentum.

According to the invention, after the restoration of a sufficient energy supply, it is accordingly first determined whether or not the earth is located in the visual field of the earth sensor and whether or not the speed $\omega$ of the flywheel still lies above a value $\omega_L - \Delta\omega$, which is smaller than the lower allowable value $\omega_L$ only by a small preselectable amount $\Delta\omega$. If these two conditions are met, the actual reacquisition process does not enter into action, rather, the normal sensor control can be put into operation, for example, which consists in that the pitch deviations which are constantly measured by the earth sensor are eliminated by means of corresponding speed changes of the flywheel.

However, if the two aforementioned conditions are not met, i.e., if the earth is situated outside of the visual field of the earth sensor and the angular velocity of the flywheel is less than $\omega_L - \Delta\omega$, the reacquisition process for the pitch attitude enters into action.

Accordingly, a first increase in angular velocity is commanded for the flywheel, i.e., a corresponding desired speed $\omega_C$ is preset for it which ensures that the satellite slows down its rotation, but that this rotation is not brought to zero before the earth enters the visual field of the earth sensor and the latter determines a zero passage of the pitch deviation ($\theta = 0$). At this point in time, another increase in speed is commanded for the flywheel which ensures that the satellite not only loses all of its residual angular momentum, but also reverses its rotational direction. All of this occurs because of the angular momentum conservation theorem. Because of the reversal of the direction of the rotation of the satellite, the earth sensor soon determines a new zero passage of the pitch deviation. The satellite then still possesses, in general, an angular momentum which is considerably greater than a certain preselectable value $H_{so}$.

This value $H_{so}$ is dependent on the visual field of the earth sensor as well as on the maximum torque applicable to the flywheel. The greater the visual field of the sensor and the greater this turning moment, the greater the value $H_{so}$ which can be selected.

Immediately after the aforementioned, second zero passage of the pitch deviation, a reduction in angular velocity is command for the flywheel, which ensures that the satellite again changes its rotational direction. The corresponding commanded change in angular velocity is $qH_s/I_w$, wherein $H_S$ is the angular momentum of the satellite and $I_w$ is the moment of inertia of the flywheel. By means of selecting the factor q ($1 < q < 2$), particularly $q = 1.5$, it is now achieved that the satellite already has a lower angular momentum during the next zero passage of the pitch deviation than in the second zero passage. For $q = 1$, the satellite would stop with a constant pitch deviation, and for $q > 2$, its angular momentum would be additionally increased during the third zero passage of the pitch deviation.

During every additional zero passage, a reduction or increase in speed is now commanded in an alternating manner for the flywheel every time in such a way that the angular momentum of the satellite remaining at the moment of the zero passage becomes increasingly smaller and finally falls below the value $H_{so}$. Then, for example, one can switch over to the aforementioned sensor control.

The angular momentum $H_S$ of the satellite at the point in time of the respective zero passages which is to be taken into account in calculating the expression $qH_s/I_w$, can indeed be measured directly in various conventional manners, but it is particularly advantageous to estimate this angular momentum with the aid of the process indicated in the following.

This process only makes use of the constant measurement of the angular velocities $\omega$ of the flywheel and the determination of the zero passages of the pitch deviation by means of the earth sensor as already explained. In addition, it is necessary to determine by means of constant comparison of the measured speeds of the flywheel with the respective preset commanded values $\omega C$ when equality occurs between these values. At these points in time, and at the points in time of the aforementioned zero passages of the pitch deviation, the corresponding speeds $\omega$ of the flywheel are to be recorded. At every point in time of the zero passage, the angular momentum of the satellite $H_S$ present at those times can then be estimated from these speed values. This manner of proceeding can be substantiated by the following mathematical derivation.

The basis for the estimation of the angular momentum of the satellite is formed by the two equations $$I_Y \ddot{\theta} = -T \qquad (1a)$$
$$-I_W \dot{\omega} = T \qquad (1b)$$

$I_Y$ designates the moment of inertia of the satellite around the pitch axis, $I_W$ designates the moment of inertia of the flywheel, $\theta$ designates the pitch angle of the satellite, i.e., the deviation of the projection of the Z axis in the orbital plane from the zero position given by the connection between the satellite and the earth's center, $\omega$ designates the angular velocity of the flywheel, and T designates the torque exerted on the flywheel, i.e., the sum of the control torque and the frictional torque. The equations express that a turning moment T exerted on the flywheel results in a corresponding change of its angular velocity $\omega$, wherein this effects a corresponding oppositely directed change of the rotational velocity of the satellite, according to the angular momentum conservation theorem.

Let $t_m$, $\theta_m$, $\dot{\theta}_m$, $\omega_m$, $t_{m+2}$, $\dot{\theta}_{m+2}$ and $\theta_{m+2}$ be the points in time of the zero passages of the pitch deviation and the values of the variables present there. It follows by means of double integration of equation (1a) that $$I_Y(\theta_{m+2} - \theta_m) = I_Y \dot{\theta}_m(t_{m+2} - t_m) - \int_{t_m}^{t_{m+2}} \int_{t_m}^{\tau} T d\tau_1 d\tau. \qquad (2)$$

By adding the equations (1a) and (1b) and integrating between the limits $t_m$ and $t_{m+2}$ $$I_Y \dot{\theta}_{m+2} - I_W \omega_{m+2} = I_Y \dot{\theta}_m - I_W \omega_m$$

is obtained, wherein $m \geq 1$ and is odd. Accordingly, it follows for the angular momentum $H_s$ of the satellite, according to $H_s = I_Y \omega_{m+2}$ by means of combining the equations (2) and (3), that $$H_S = -I_W(\omega_m - \omega_{m+2}) + \qquad (4)$$

$$\frac{1}{t_{m+2} - t_m} \int_{t_m}^{t_{m+2}} \int_{t_m}^{\tau} T d\tau_1 \, d\tau + \frac{I_Y(\theta_{m+2} - \theta_m)}{t_{m+2} - t_m}$$

and, after taking into account $T_W = -I_W \dot{\omega}$.

$$H_S = -I_W \left[ \frac{\int_{t_m}^{t_{m+2}} \omega d\Sigma}{t_{m+2} - t_m} - \omega_{m+2} \right] + I_Y \frac{\theta_{m+2} - \theta_m}{t_{m+2} - t_m} \qquad (5)$$

For the zero passages of the pitch deviation $\theta$, the second term on the right-hand side of equation (5) equals zero. If the time interval between $t_m$ and $t_{m+2}$ is split into two subintervals which are separated by time point $t_{m+1}$, one obtains $$H_S = I_W \left\{ \omega(t_{m+2}) - \frac{1}{t_{m+2} - t_m} \left[ \int_{t_m}^{t_{m+1}} \omega d\tau + \int_{t_{m+1}}^{t_{m+2}} \omega d\tau \right] \right\} \quad (6)$$

Assuming that a constant torque $T = -I_W \dot{\omega}$ acts on the flywheel between time points $t_m$ and $t_{m+1}$, and that this torque is $T=0$ between time points $t_{m+1}$ and $t_{m+2}$, i.e., the angular velocity $\omega$ of the flywheel is not a function of time, one obtains $$\frac{H_S}{I_W} = \omega_{m+2} - \frac{1}{2\Delta t_2} \left[ (\omega_{m+1} + \omega_m)\Delta t_1 + 2\omega_{m+1}\Delta t_2 \right] \quad (7)$$

Thus, equation (7) is the estimated angular momentum $H_S$ of the satellite at time point $t_{m+2}$ of a zero passage of the pitch deviation $\theta$. Aside from the known value for the moment of inertia $I_W$ of the flywheel, only measurement values for the angular velocity $\omega$ of the flywheel at three different points in time, as well as the corresponding time intervals, enter into the calculation. The indices m and (m+2) designate the time points of the zero passages, the index (m+1) designates the respective time point $t_{m+1}$, between the latter ones at which equality occurs between the commanded angular velocity $\omega_C$ of the flywheel and the corresponding measured value. Thus, in order to determine the estimated angular momentum $H_S$ at the respective zero passage $t_{m+2}$, only the corresponding measurement values for $\omega$ and t at the two preceding time points $t_{m+1}$ and $t_m$ need be available.

The process, according to the invention makes it possible to automatically restore the lost earth orientation of the yaw axis (Z axis) of the satellite, it being assumed only that the energy supply for the flywheel motor and the earth sensor is provided again, that the speeds or angular velocities of the flywheel can be measured, and, finally, that the respective angular momentum $H_S$ of the satellite can either be measured or estimated according to equation (7), at the time points for the zero passages of the pitch deviation. No reaction propulsion jets are required for implementing the process, a corresponding consumption of propellant does not occur, the ground station need not intervene and, in addition, an earth sensor can be used which only has a relatively small measuring range.

An embodiment of the invention is explained in more detail in the following by means of the drawings and a table.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE PREFERRED EMBODIMENT

Figure 1:
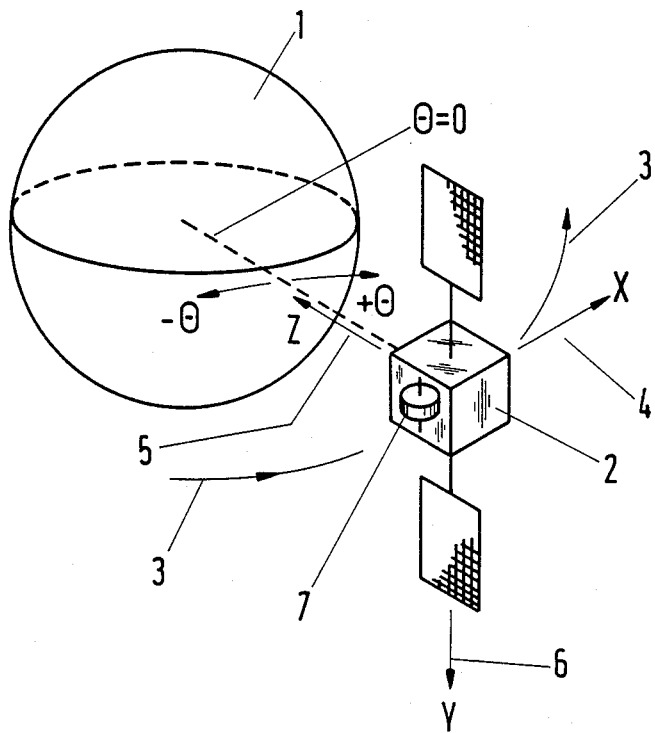
FIG. 1 is a schematic view of a satellite in an equatorial earth orbit with its respective coordinate system X, Y, Z.

Referring to the drawings in particular, the invention embodied therein comprises a process for reacquiring the pitch attitude of an earth satellite after it has been lost owing to a reduction in rotating speed of a flywheel of the satellite.

FIG. 1 shows a satellite 2 on a geosynchronous equatorial orbit 3 in a schematic manner. A Cartesian coordinate system X, Y, Z, which is fixed with respect to the satellite, is centered on the center of gravity or mass of the satellite. The satellite 2 is three-axis stabilized with respect so that its roll axis (X axis) is directed in the direction of orbit, its yaw axis (Z axis) is directed in the direction of the center of the earth 1, and its pitch axis (Y axis) is directed perpendicularly to the two other axes and relative to the orbital plane. An earth sensor 8 is directed to the earth 1, for example, in such a way that it constantly observes the two earth horizons. It generates signals which represent the pitch deviation $\theta$, i.e., the angular deviation of the direction of the Z axis from that of the zero direction given by the straight line connecting the satellite and the center of the earth. In addition, a flywheel 7, which is directed with its axis of rotation parallel to the pitch axis 6, is arranged in the satellite. This serves for attitude control about the pitch axis. This control should cause the yaw axis 5 to remain constantly directed to the earth'S center during orbit. Thus, the satellite 2 constantly has its own small angular momentum. As soon as the yaw axis 5 migrates from the desired zero orientation, it is returned to it again by means of a corresponding change in speed of the flywheel 7.

The satellite 2 has, e.g., a moment of inertia about the pitch axis $I_Y = 1500$ Nmsec$^2$, the flywheel 7 has a moment of inertia $I_W = 0.1$ Nmsec$^2$, the maximum torque $T_{max}$ to be applied to the flywheel 7 is 0.1 Nm in the positive or negative rotational direction. The normal range of operation of the flywheel is assumed to be between 45 and 55 Nmsec. It follows from this for the lower and upper values of the angular velocities allowable in normal operation: $\omega_L = 45/I_W$ rad/sec and $\omega_U = 55/I_W$ rad/sec. It is assumed that the flywheel 7 does not leave the indicate range of its angular velocity between the values $\omega_L$ and $\omega_U$ during normal operation.

Figure 2:
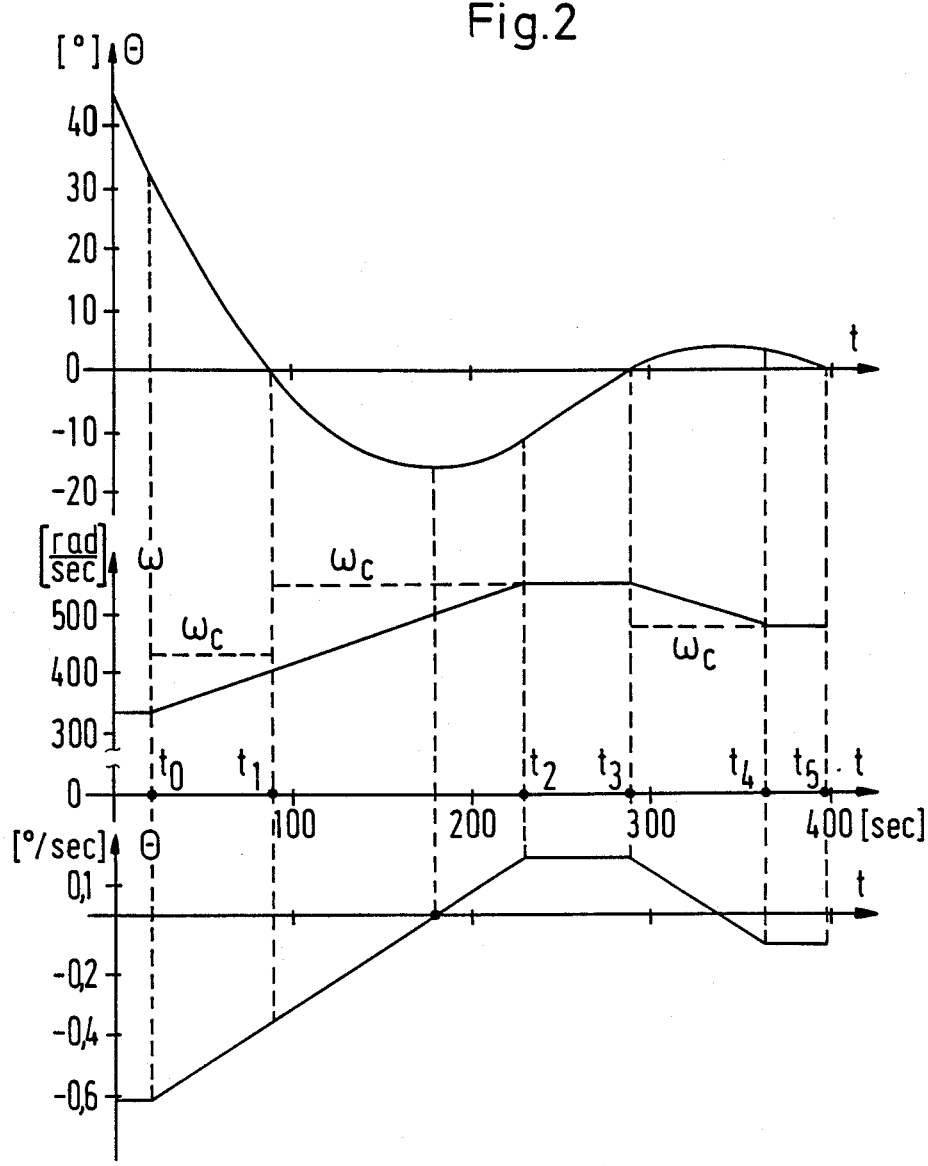
FIG. 2 is a diagram of the course with respect to time of the magnitudes $\theta$, $\omega$ and $\dot{\theta}$, during the implementation of a reacquisition process according to the invention.

After an outage of the energy supply on satellite 2, for example, in the shadow phase of the orbit, the speed or angular velocity of the flywheel 7 decreases to an unknown value due to unavoidable friction effects. When the energy supply is restored for example, after the satellite emerges from the shadow phase, the lost earth orientation of the yaw axis can be recovered by means of applying the reacquisition process according to the invention. If there is enough energy available, for example, if laminar solar generator panels of the satellite are sufficiently turned toward the sun, the reacquisition process can be started. First, it must be established whether or not the earth is situated outside of the visual field of the earth sensor 8. If this is the case, it must be determined whether or not the angular velocity ω of the flywheel 7 lies below the value $ω_L$ by a selected amount, e.g., Δω=1.5 rad/sec. If this is also the case, an angular velocity $ω_C=ω_L-Δω$ is commanded for the flywheel 7 after a time point $t_0$. This selection ensures that the angular velocity of the flywheel 7 has not yet returned to the normal operating range so that the rotational movement of the satellite 2 which has received the angular momentum lost by the flywheel 7 during the energy outage because of the angular momentum conservation theorem, is not yet completely reduced to zero. That is, it must be ensured that the earth first enters the visual field of the earth sensor 8 again. Thus, the satellite must not have been completely braked beforehand and it should also not change its rotational direction before reaching its first zero passage. This first phase of the running up of the flywheel 7 is shown in the diagram of FIG. 2 between time points $t_0$ and $t_1$. The diagram shows the courses with respect to time of the pitch deviation θ of the satellite (top), the angular velocity $\dot{θ}$ of the flywheel 7 (center), and the angular velocity $\dot{θ}$ of the satellite 2 (bottom). At the time point $t_1$(m=1, n=1), a zero passage of the pitch deviation θ occurs for the first time and is determined by the earth sensor 8. At this time point, a new angular velocity $ω_C=ω_U$ is commanded for the flywheel 7. Thus, the flywheel 7 continues to run up, the satellite 2 continues to be slowed down in its rotation until its angular velocity $\dot{θ}$ passes through zero, i.e., the satellite reverses its rotational direction (θ changes signs). At this time point, the flywheel 7 has not yet achieved the preset angular velocity $ω_C=ω_U$, rather, this first happens at time point $t_2$ (m=2, 1=1). From this point on, the torque T acting on the flywheel 7 which was constantly equal to −0.1 Nm, for example, between time points $t_0$ and $t_2$, equals 0. The flywheel 7 is thus no longer accelerated, its angular velocity remains constant, and also, the angular velocity $\dot{θ}$ of the satellite 2 does not change. At time point $t_3$ (m=3, n=2), the second zero passage of the pitch deviation θ occurs. From this time point on, a new value for the angular velocity ω which is reduced by $qH_s/I_w$ relative to the old value $ω_C=ω_U$, is preset for the flywheel 7. The factor q is selected at q=1.5, specifically because of the reasons listed above. Accordingly the factor q lies in the middle between the two limiting values q=1.0 and q=2.0. The value for $H_S$ can be determined for the first time at the time point of this second zero passage of the pitch deviation θ, specifically according to equation (7). The measurement values for the angular velocity at time points $t_3$, $t_2$, $t_1$ and the time differences $t_2-t_1$ and $t_3-t_2$ are required for this purpose.

As shown in the diagram of FIG. 2, the flywheel 7 now reduces its angular velocity ω again until it has achieved the commanded angular velocity $ω_C$ at time point $t_4$ (m=4, L=2). At this time point, the satellite 2 has already reversed its rotational direction again, so that the third zero passage of the pitch deviation θ is registered by the earth sensor 8 at time point $t_5$ (m=5, n=3). The angular velocities $\dot{θ}$ and $\dot{θ}$ of the flywheel 7 and the satellite 2 are constant between time points $t_3$ and $t_4$.

At time point $t_5$, the residual angular momentum $H_S$ of the satellite 2 is again determined, likewise by means of the equation (7). This residual angular momentum $H_S$ has already decreased relative to time point $t_3$ of the second zero passage. Now a new angular velocity $ω_C$ which exceeds the preceding desired value by the amount $qH_S/I_W$, is commanded again for the flywheel 7. The result of this, again, is that the flywheel is accelerated until the pregiven angular velocity $ω_C$ is achieved and that the satellite 2 again reverses its rotational direction and aims for another zero passage. By means of the indicated process, the satellite 2 oscillates around the zero value of the pitch angle with increasingly diminishing amplitude until the satellite angular momentum $H_S$ in the zero passage falls below the preselected threshold $H_{SO}$ which is selected approximately at $H_{SO}=1.5$ Nmsec. Until time point $t_5$, the course of values θ, ω and $\dot{θ}$ with respect to time is given in FIG. 2 and the numerical values resulting from the initial conditions are seen in the following table. The numerical values were determined on the basis of the equations (1a), (1b) and (7). After $t_m=0.0$ sec, another 20 sec must elapse so that the functioning of the components is ensured with certainty.

| m | $t_m$ [sec] | $θ_m$ [°] | $\dot{θ}_m$ [°/sec] | $ω_m$ after $t_m$ [rad/sec] | $ω_c$ after $t_m$ [rad/sec] | $T_c$ after $t_m$ [Nm] | $H_s$ [Nmsec] |
|---|---|---|---|---|---|---|---|
|   | 0.00 | 45.00 | −0.61 | 340.00 |       | 0.0  |      |
| 0 | 20.00 | 32.80 | −0.61 | 340.00 | 430.0 | −0.1 |      |
| 1 | 88.44 | 0.00 | −0.35 | 408.44 | 550.0 | −0.1 |      |
|   | 180.07 | −16.04 | 0.00 | 500.07 | 550.0 | −0.1 |      |
| ·2 | 230.00 | −11.28 | 0.19 | 550.00 | 550.0 | 0.0  |      |
| 3 | 289.37 | 0.00 | 0.19 | 550.00 | 475.2 | 0.1  | 4.99 |
| 4 | 364.17 | 3.53 | −0.10 | 475.20 | 475.2 | 0.0  |      |
| 5 | 399.47 | 0.00 | −0.10 | 475.20 | 475.2 | −0.1 | −2.54 |

During the time interval in which a desired value $ω_C$ of the angular velocity of the flywheel 7 is commanded, but in which this desired value has not yet been reached, the general control law for the torque acting on the flywheel is $T_C=-k(ω_M-ω_C)$, wherein $ω_M$ is the respective measurement value of the angular velocity and k is a controller parameter. During the greatest part of the aforementioned time interval, $T_C$ exceeds the maximum torque $T_{max}$ which can be applied so that the actual acting torque T remains constant at the value $T_{max}$. Therefore, the assumption made in the above calculations that the torque T is constant between the time points $t_m$ and $t_{m+1}$, is justified.

The control for reacquisition described above can be designated as a speed control since speed values for the flywheel 7 are predominantly used. When falling below the residual angular momentum $H_S$ of the satellite 2 during the zero passage of the pitch deviation θ, control is switched to another type of control which is designated as a sensor control. This is based on the following control law:

$$T_C=k_1T_1L(θ_M)+k_2x+k_3(θ_M-θ_S) \quad (8)$$

In this instance, $k_1$, $k_2$, $k_3$ and $T_1$ are controller parameters, $θ_M$ is the pitch deviation angle measured by the earth sensor, L is a limiting function which remains constant above a preselectable measurement value $\theta_M$, and $\theta_S$ is a parameter indicated in the following. The following relationship exists between x and L $$x = L(\theta_M)_1 \int_{t_S}^{t} dx = x(t) - x(t_S) = \int_{t_S}^{t} L dt \quad (9)$$

The function $L(\theta_M)$ in dependence upon $\theta_M$ is a straight line on the positive and negative sides of zero, the slope value being 1, and continuing with a constant value at a specific value $\theta_{MS}$.

This value is generally given by means of the earth sensor which has a linear range and a saturation range $|\theta_M| \geq \theta_{MS}$ in which it only supplies the correct sign.

The parameter $\omega_S$ is set so as to be equal to the measurement value $\omega_M$ for the angular velocity of the flywheel 7 at the starting time point $t_S$ of the sensor control: $\omega_S = \omega_M(t_S)$. For the additional parameter $x(t_S)$:

$$x(t_S) = -1.5 \frac{H_S k_3}{I_W k_2} \quad (10)$$

in the event that the sensor control is switched on when the estimated satellite angular momentum Hs has become less than 1.5 Nmsec. The sensor control can also be switched on if the earth enters the visual field of the earth sensor at the beginning of the restoration of the energy supply after a short waiting time. Then $x(t_S)=0$ is set.

The use of this sensor control is directly connected with the preceding speed control as explained above. A value for the initial parameter $x(t_S)$ is then immediately available according to equation (10) for the damping element $k_2 x$ which is present in the control law, as a result of the angular momentum $H_S$ estimated during the last zero passage of the pitch deviation. This is advantageous because the derivation with respect to time of the pitch deviation angle $\theta$ would otherwise have to be used for the formation of a damping element in the control law of the sensor control which is undesirable in terms of measurement and control technology.

When the earth disappears from the visual field of the earth sensor during sensor control, then $\omega_C = \omega_L$ is set until the next earth passage if the satellite rotates to the negative side or $\omega_C \omega_U$ if the satellite rotates to the positive side.

While a specific embodiment of the invention has been shown and described in detail to illustrate the application of the inventive principles, it will be understood that the invention may be embodied otherwise without departing from such principles.

What is claimed is:

1. A process for the reacquisition of the pitch attitude of an earth satellite which is equipped with an earth sensor having a visual field for viewing the earth, and a flywheel having a rotational axis oriented in the direction of a pitch axis (Y) of a coordinate system (X, Y, Z) which is fixed with respect to the satellite, the satellite being normally oriented in orbit with a yaw axis (Z) pointing toward the earth'S center and with a roll axis (X) pointing in the orbit direction, the flywheel rotating at an angular velocity $\omega$ which is maintained between a lower value $\omega_L$ and an upper value $\omega_U$ in normal operation, the process being used in the event the angular velocity falls below the lower value $\omega_L$ due to an insufficient energy supply and the earth orientation of the yaw axis is consequently lost, whereafter the energy supply is restored, and the earth (1) is no longer in the visual field of the earth sensor and where the angular velocity has fallen below the lower value $\omega_L$ by more than a preselected amount $\Delta\omega$, the process comprising:

(a) increasing the angular velocity of the flywheel toward a new value $\omega_C = \omega_L - \Delta\omega$ until the earth sensor determines a zero passage of a pitch deviation ($\theta = 0$);

(b) then, further increasing the angular velocity toward a new value $\omega_C = \omega_U$ which guarantees a reversal of rotational direction of the satellite;

(c) then, during every additional zero passage of the pitch deviation as determined by the earth sensor, applying a new angular velocity to the flywheel which alternately decreases and increases the angular velocity of the flywheel and is distinguished from a respective preceding angular velocity by an amount $qH_S/I_W$ wherein $H_S$ is the actual or estimated angular momentum of the satellite during the zero passage, $I_W$ is the moment of inertia of the flywheel, and $1 < q < 2$; and (d) repeating step (c) until the angular momentum of the satellite during the zero passage has fallen below a preselected value $H_{SO}$.

2. A process according to claim 1, wherein, in order to determine the estimated angular momentum $H_S$, the angular velocity $\omega(t)$ of the flywheel (7) is constantly measured and is compared with the respective commanded angular velocities $\omega_C$, and, at times $t_n$, where n has consecutive whole values $\geq 1$, of the zero passages ($\theta = 0$), the corresponding angular velocity $\omega(t_n)$ is stored, and at times $t_L$, where L has consecutive whole values $\geq 1$, in which there is equality between the measured and commanded angular velocities ($\omega(t_L) = \omega_C$), the corresponding angular velocities are stored together with the respective times $t_m$, where m has consecutive whole values $\geq 1$ and m is even for m = 2L and odd for m = 2n−1, are stored, and in that the estimated angular momentum Hs is calculated during every zero passage ($\theta = 0$) according to the formula $$\frac{H_S}{I_W} = \omega_{m+2} - \frac{1}{2\Delta t_2} [(\omega_{m+1} + \omega_m)\Delta t_1 + 2\omega_{m+1}\Delta t_2]$$

wherein the following is true: $\omega_m = \omega t_m$) and $\Delta t_2 = t_{m+2} - t_{m+1}$ and $\Delta t_1 = t_{mj+1} - t_m$.

3. A process according to claim 1, wherein q = 1.5.

4. A process according to claim 2, wherein q = 1.5.

5. A process according to claim 1, wherein, after the angular momentum $H_S$ of the satellite (2) falls below the value $H_{SO}$, a control law (sensor control) having the following formula is given for continued pitch attitude control:

$$T_C = k_1 T_1 L(\theta_M) + k_2 x + k_3(\omega_M - \omega_S)$$

wherein $T_C$ designates the torque to be applied to the flywheel (7), $k_i$ (i = 1,2,3) and $T_1$ designate controller constants, $L(\theta_M)$ designates a limiting function for the measured value $\theta_M$ of the pitch attitude, and $\omega_M$ designates the measured value of the angular velocity of the flywheel (7), the relationship of $\dot{x} = L(\theta_M)$ exists between x and L, and $\omega_S$ equals the initial value $\omega_M(t_S)$ for the starting time point $t_S$ of the sensor control.

6. A process according to claim 5, wherein the initial value $x(t_S)$ is determined, (with $1 < q < 2$), according to the term $$x(t_S) = qH_S k_3 / I_W k_2.$$

* * * * *